United States Patent [19]

Copley

[11] Patent Number: 4,645,214

[45] Date of Patent: Feb. 24, 1987

[54] WELLHEAD SEALING ASSEMBLY

[75] Inventor: Kelly S. Copley, Houston, Tex.

[73] Assignee: Cameron Iron Works, Inc., Houston, Tex.

[21] Appl. No.: 734,544

[22] Filed: May 16, 1985

[51] Int. Cl.⁴ .................. E21B 33/03; F16J 15/00; F16J 15/18

[52] U.S. Cl. ...................... 277/112; 166/84; 277/102; 277/125; 277/195; 285/348; 285/351

[58] Field of Search ............. 277/35, 50, 102, 195, 277/198, 199, 110, 112, 115, 116.2, 117, 119, 123, 125, 129; 285/330, DIG. 14, 351, 348; 166/84, 81

[56] References Cited

U.S. PATENT DOCUMENTS

| | | | |
|---|---|---|---|
| 1,725,836 | 8/1929 | Solberg | 277/125 X |
| 1,780,764 | 11/1930 | Noble | 277/123 |
| 2,178,699 | 11/1939 | Penick et al. | 277/129 X |
| 2,364,133 | 12/1944 | De La Roza, Sr. | 277/112 X |
| 2,456,081 | 12/1948 | Penick | 277/112 X |
| 2,471,658 | 5/1949 | Shaffer et al. | 277/123 |
| 3,492,009 | 1/1970 | Bevesnev et al. | 277/112 |
| 3,726,546 | 4/1973 | Brown | 285/330 X |
| 4,149,731 | 4/1979 | Yoshida et al. | 277/199 X |
| 4,349,205 | 9/1982 | McGee et al. | 277/117 X |
| 4,489,916 | 12/1984 | Stevens | 277/121 X |

Primary Examiner—Allan N. Shoap
Attorney, Agent, or Firm—Vinson & Elkins

[57] ABSTRACT

A sealing assembly for sealing between a wellhead housing and a casing suspended in the housing including a base ring with an upper surface with inner and outer shoulders and an annular recess between the shoulders, a first energizing ring with a shoulder facing the base ring inner shoulder, a projection to extend into the annular recess and upper lugs with tapered upper surfaces; a second energizing ring surrounding the first ring projection with slots to receive the first ring lugs, a lower surface facing the base ring outer shoulder and upper tapered surfaces; an inner seal ring between the base ring inner shoulder and the first ring shoulder; an outer seal ring between the base ring outer shoulder and the second ring shoulders and means for engaging the tapered surfaces at the first and second rings to energize the seal rings into sealing position.

5 Claims, 5 Drawing Figures

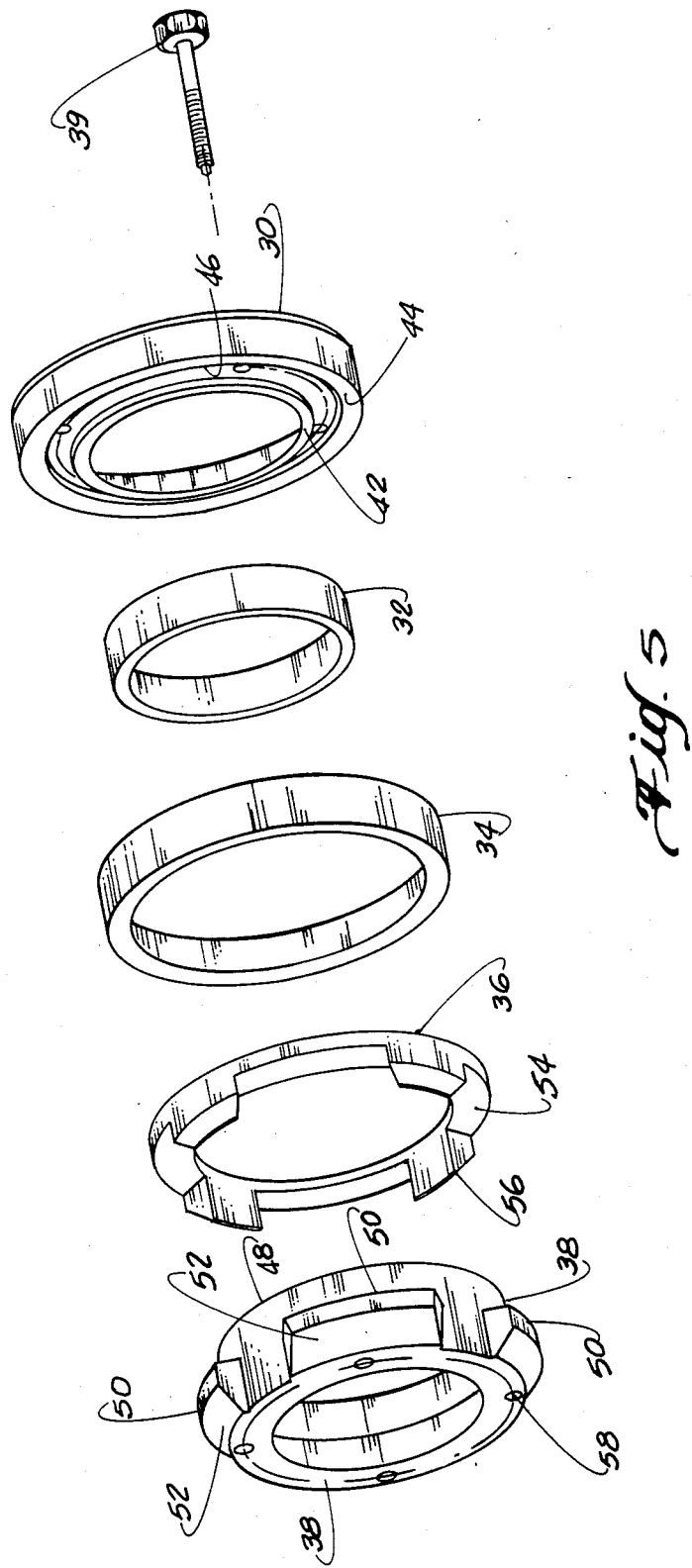

WELLHEAD SEALING ASSEMBLY

BACKGROUND

Difficulties have been encountered in prior wellhead sealing assemblies in sealing between the exterior of the casing and the interior of the wellhead housing since the exterior of the casing may vary considerably in its dimensions. Additionally, extremely cold temperatures have made sealing with elastomers difficult because they contract very measurably in cold environments.

In one example of prior art a wellhead sealing assembly designed for sealing in the annulus between the first and second casings at the wellhead of a geothermal well, the sealing assembly includes a first ring with inner and outer seals mounted thereon and separate energizing rings which are actuated by screws extending vertically through a flange spanning the annulus above the sealing assembly. This structure is shown in U.S. Pat. No. 4,299,395.

Another example of a wellhead sealing assembly is shown in U.S. Pat. No. 2,768,841. The sealing assembly in this structure includes a base ring with a sealing ring above it and a top ring which has a tapered upper-outer surface engaged by tiedown screws extending through the wellhead housing in a radial direction.

The W. L. Todd et al U.S. Pat. No. 3,494,638 discloses a sealing assembly energized by radially extending tiedown screws and the seal ring includes an upper ring, a lower ring and a seal ring between them with screws initially loading the seal rings. A similar structure is shown in the J. W. Thatch U.S. Pat. No. 2,617,485.

SUMMARY

The present invention relates to an improved wellhead assembly structure with an improved sealing assembly included therein. The improved structure includes the wellhead housing, a well casing suspended within the housing with an annular space therebetween in which the improved sealing assembly is mounted. The sealing assembly includes a base ring with inner and outer shoulders and a groove between the shoulders, an inner seal ring, an outer seal ring, a first energizing ring for energizing the inner seal ring and having lugs extending outwardly with the upper outer surfaces of the lugs being tapered downwardly and radially outward, a second energizing ring for energizing the outer seal ring and having upwardly opening slots for receiving the lugs of the first energizing ring and having upper outer shoulders which taper downwardly and radially outward, the two energizing rings are independently urged to compress their respective seal rings by the inward movement of the radially extending tiedown screws which are all positioned at the same level extending radially through the wellhead housing.

An object of the present invention is to provide an improved wellhead assembly with an improved sealing assembly in the annulus between the wellhead housing and the casing which includes separate inner and outer seal rings which can be separately energized by radially extending tiedown screws.

Another object is to provide an improved wellhead annulus sealing assembly including separately energizable inner and outer seal rings which provides sealing under extremes of cold and heat.

A further object is to provide an improved wellhead annulus sealing assembly which provides adequate sealing against a wide range of casing diameters.

Still another object is to provide an improved wellhead annulus sealing assembly which is a unitary assembly with separately energizable inner and outer seal rings.

An additional object is to provide an improved wellhead annulus sealing assembly, with separately energizable inner and outer seal rings, which remains in place and energized when the Christmas tree has been removed.

BRIEF DESCRIPTION OF THE DRAWINGS

These and other objects and advantages of the present invention are hereinafter set forth and explained with reference to the drawings wherein:

FIG. 5 is an exploded view of the components of the sealing assembly.

DESCRIPTION OF THE PREFERRED EMBODIMENT

Figure 1:
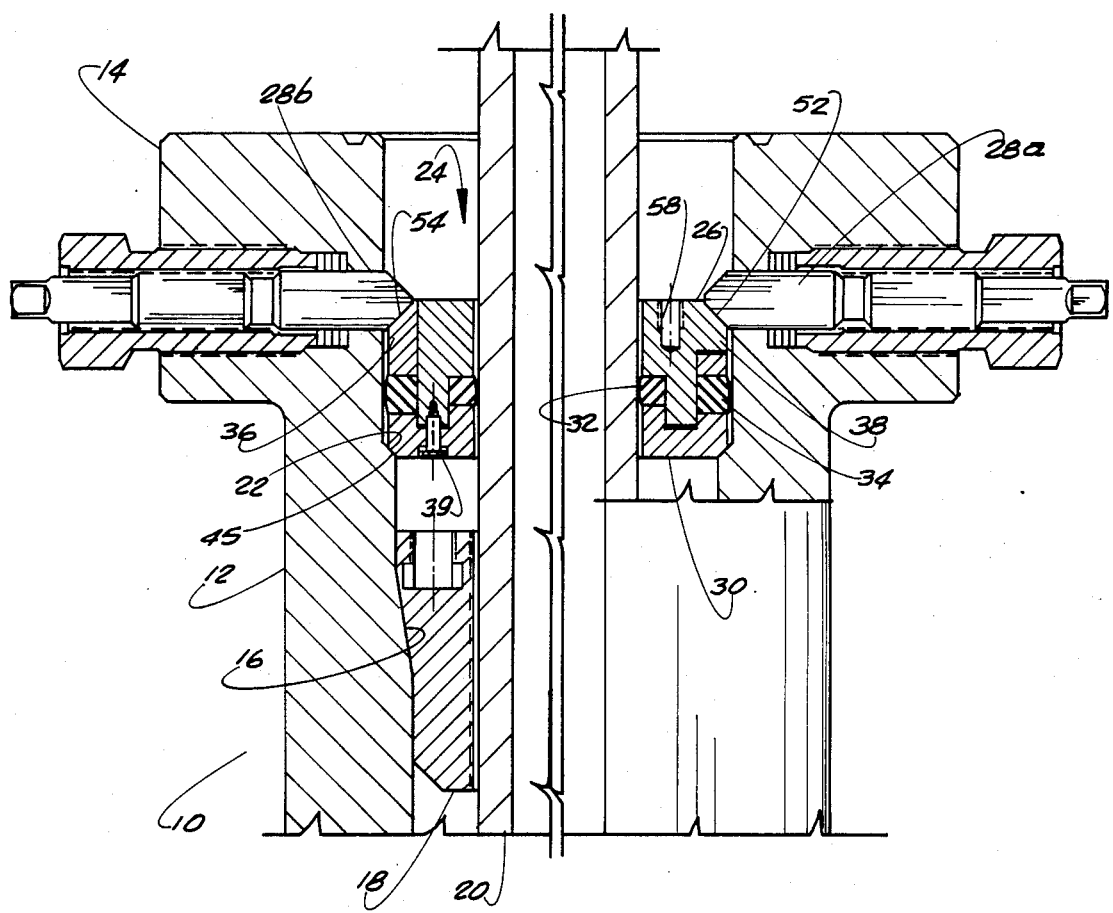
FIG. 1 is an elevation view of the improved wellhead structure of the present invention with the central portion omitted, with the left half thereof shown in section to illustrate the outer seal energizing structure and with the right half portions in section to illustrate the inner seal energizing structure.

Wellhead assembly 10 as shown in FIG. 1 includes housing 12 having upper flange 14 to which other structure, such as a Christmas tree (not shown), may be connected as desired. Housing 12 is tubular and includes upwardly facing lower tapered shoulder 16 which supports hanger ring 18 which supports casing 20 in its position extending through housing 12. Housing 12 also includes angled shoulder 22 above shoulder 16. Shoulder 22 is sized to support seal structure 24 as shown.

Seal structure 24 includes annular seal assembly 26 and tiedown screws 28a and 28b extending radially through housing flange 14. Annular seal assembly 26 includes base ring 30, inner seal ring 32, outer seal ring 34, outer energizing ring 36, inner energizing ring 38 and retaining screws 39. Base ring 30 includes upwardly facing inner shoulder 42, upwardly facing outer shoulder 44, annular groove or recess 46 between shoulders 42 and 44 and downwardly facing outer tapered surface 45. When seal structure 24 is positioned in housing 12, it is supported by engagement of surface 45 on shoulder 22 in housing 12. Outer seal ring 34 is positioned on shoulder 44 and is engaged by outer energizing ring 36. Inner seal ring 32 is positioned on shoulder 42 and is engaged by inner energizing ring 38. Inner energizing ring 38 includes depending annular projection 48 which is positioned between seal rings 32 and 34 and extends into recess 46.

Figure 2:
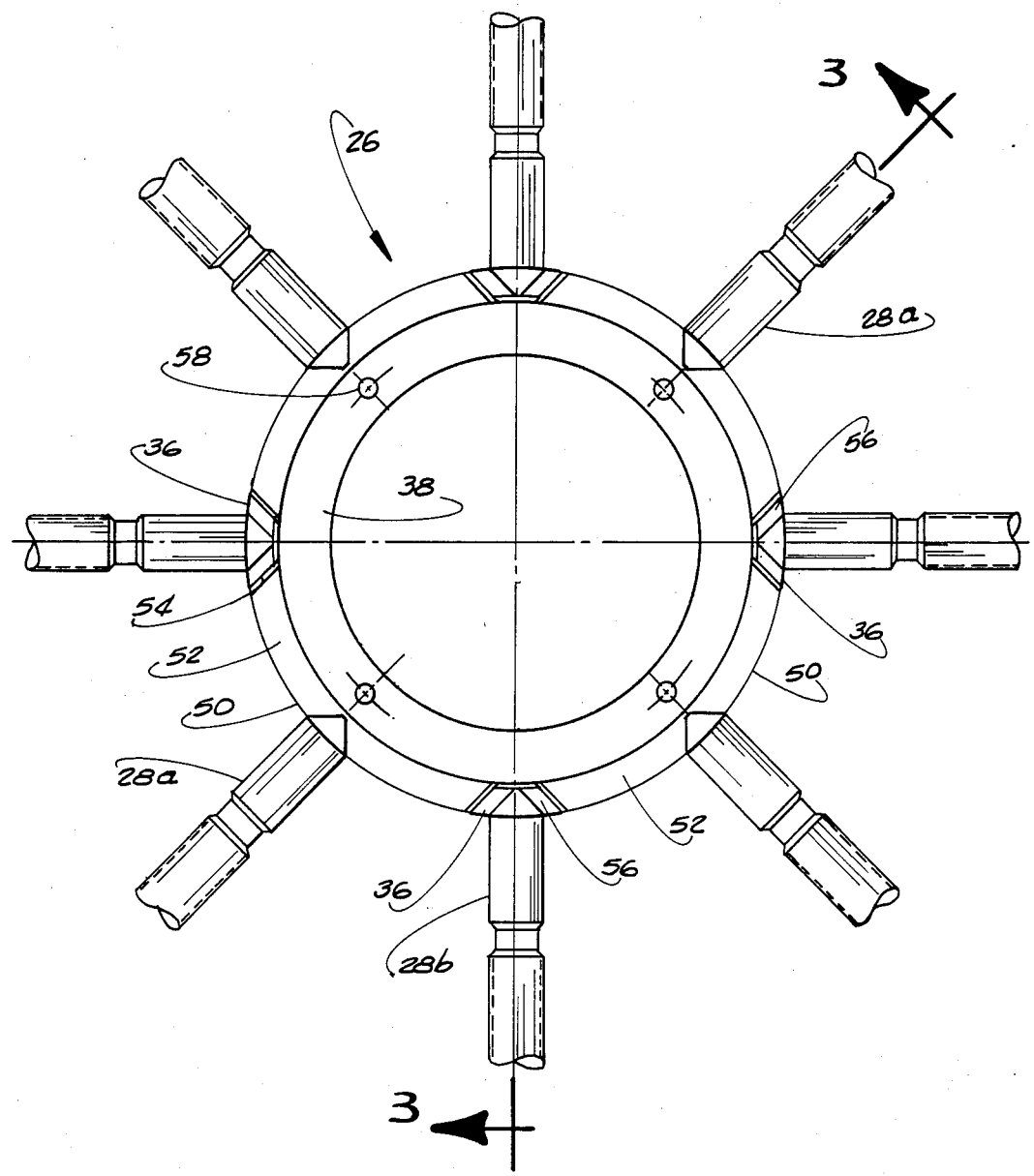
FIG. 2 is a plan view of the sealing assembly showing the tiedown screws schematically thereon to illustrate the operation of each set of screws with the energizing rings.

As shown in FIGS. 2 and 5, inner energizing ring 38 also includes outwardly extending lugs 50 with their upper outer surfaces 52 tapered downwardly and outwardly. Outer energizing ring 36 is positioned around projection 48 of ring 38 and includes upwardly facing slots 54 in which lugs 50 of ring 38 are received and upper surfaces 56 which taper downwardly and outwardly. The interengagement of lugs 50 in slots 54 positions the upper surfaces of energizing rings 36 and 38 on approximately the same level so that they are in proper position to be engaged by tiedown screws 28b and 28a. The positioning of lugs 50 in slots 54 and the engagement of screws 28b and 28a with energizing rings 36 and 38 is best seen in FIG. 2. The upper surface of energizing ring 38 has a plurality of tapped holes 58 to receive lifting lugs (not shown) for placing and removing sealing assembly 26. In this drawing the screws 28 are designated 28a for those screws which engage and energize inner energizing ring 38 and 28b for those screws which engage and energize outer energizing ring 36.

Figure 3:
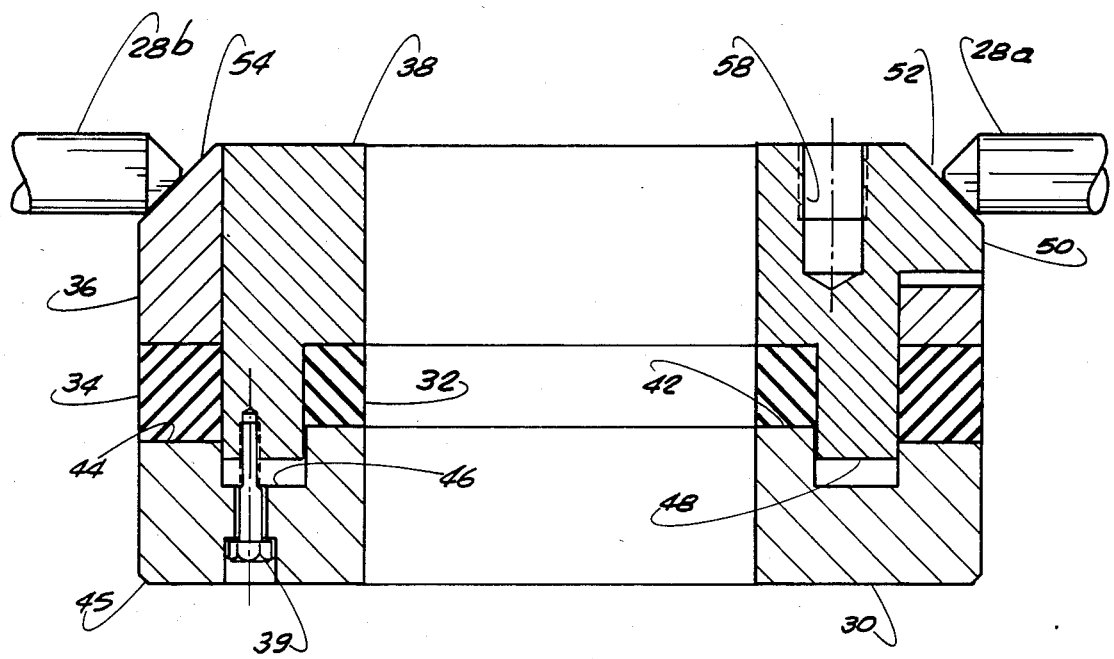
FIG. 3 is a sectional view taken along line 3—3 in FIG. 2 of the sealing assembly in its assembled position before it is set.
Figure 4:
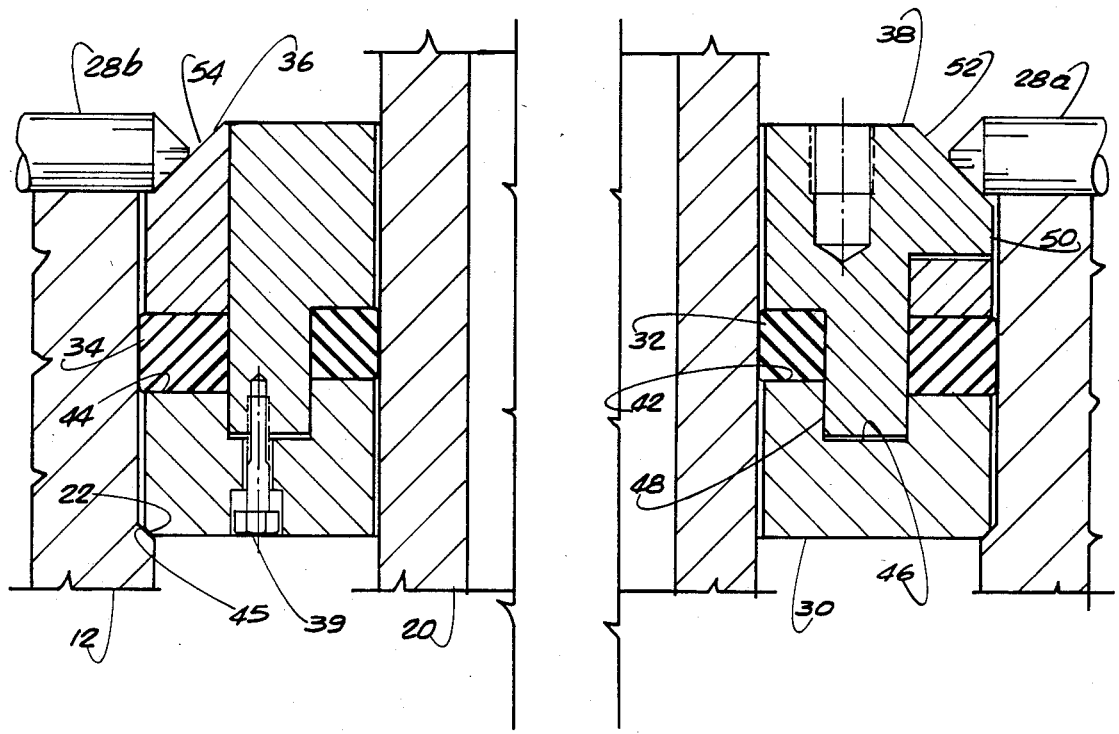
FIG. 4 is similar section view of the sealing assembly but showing it in its set position.

Seal assembly 26 is shown in FIG. 3 in its assembled position without any forces being exerted on seal rings 32 and 34 which would compress the rings into their set positions. Seal assembly 26 as shown in FIG. 4 has been moved to its set position with seal rings 32 and 34 being compressed axially to cause them to expand radially into sealing engagement with the surfaces against which they are to seal.

Retainer screws 39, as shown in FIG. 3, keep the individual components of seal assembly 26 together so they can be installed and removed as one preassembled unit.

What is claimed is:

1. A seal assembly comprising
   a base ring having an inner shoulder, an outer shoulder and an annular recess therebetween on its upper surface,
   a first energizing ring having a downwardly facing inner shoulder facing said inner base ring shoulder, a downwardly extending projection engaging in said annular recess and spaced from the bottom thereof and upper outwardly extending lugs with upper tapered surfaces tapering downwardly and outwardly,
   a second energizing ring surrounding said downwardly extending projection on said first energizing ring and having upwardly facing slots to receive said lugs, a lower surface facing said outer base ring shoulder and an upper tapered surface tapering outwardly and downwardly,
   an inner seal ring within said energizing ring projection and being between said inner base ring shoulder and said shoulder on said first energizing ring, and
   an outer seal ring surrounding said energizing ring projection and being between said outer base ring shoulder and said shoulder on said second energizing ring.

2. A seal assembly according to claim 1 including means for retaining said first energizing ring in assembled relationship to said base ring.

3. A seal assembly according to claim 1 wherein said slots on said second energizing ring have sufficient height to allow sufficient energizing movement of the lugs of said first energizing ring to ensure the proper setting and sealing position of said inner seal ring.

4. A seal assembly according to claim 1 wherein said slots and upper tapered surfaces in said second energizing ring are uniformly spaced around said energizing ring to allow separate setting and sealing of said inner seal ring and said outer seal ring resulting from the engagement of the tapered surfaces of said energizing rings by the radially extending tiedown screws which are all positioned at the same level.

5. A sealing assembly for sealing between the interior of a wellhead housing and the exterior of a casing supported within said housing responsive to the inward movement of the tiedown screws extending through said housing comprising
   a base ring having an inner and an outer upwardly facing shoulder, and a lower upwardly facing surface between said shoulders,
   an inner seal ring positioned on said inner base ring shoulder,
   an outer seal ring positioned on said outer base ring shoulder,
   an outer energizing ring positioned on said outer seal ring and having a plurality of upwardly facing outwardly tapering tiedown screw receiving surfaces,
   an inner energizing ring having an annular projection extending between said outer seal ring and said inner seal ring and spaced from said lower surfaces, an inner shoulder engaging said inner seal ring and a plurality of upwardly facing outwardly tapering tiedown screw receiving surfaces,
   a plurality of tiedown screws extending radially inward into engagement with said screw receiving surfaces of said outer energizing ring,
   a plurality of tiedown screws extending radially inward into engagement with said screw receiving surfaces of said inner energizing ring, and
   means for retaining said base ring, said seal rings and said energizing rings in assembled relationship which allows separate setting movement of said energizing rings, wherein the inward movement of the tiedown screws in engagement with the receiving surfaces of said energizing rings causes setting of said seal rings to sealing position.

* * * * *